United States Patent [19]
Klein et al.

[11] 3,805,262
[45] Apr. 16, 1974

[54] TRANSMISSION ANTENNA MIXER DOPPLER MOTION DETECTION
[75] Inventors: Carl F. Klein, Milwaukee; Alfred Giovanelli, Kenosha, both of Wis.
[73] Assignee: Johnson Service Company, Milwaukee, Wis.
[22] Filed: July 3, 1972
[21] Appl. No.: 268,526

[52] U.S. Cl.................... 343/5 PD, 343/7.7, 343/8
[51] Int. Cl............................ G01s 9/42, G01s 9/44
[58] Field of Search ...................... 343/5 PD, 7.7, 8

[56] References Cited
UNITED STATES PATENTS
| | | | |
|---|---|---|---|
| 3,611,374 | 10/1971 | Draysey | 343/5 PD |
| 3,599,196 | 8/1971 | Boyko | 343/5 PD |
| 3,691,556 | 9/1972 | Bloke | 343/5 PD |
| 3,614,729 | 10/1971 | Fujimoto et al. | 343/5 PD |

*Primary Examiner*—Maynard R. Wilbur
*Assistant Examiner*—G. E. Montone
*Attorney, Agent, or Firm*—Andrus, Sceales, Starke & Sawall

[57] ABSTRACT

An intrusion Doppler motion detector detects the motion of a human intruder into a selected volumetric space. An oscillator of the avalanche or IMPATT diode type operating above 5GHz is mounted within an oscillator cavity and establishes and transmitts an RF field to a separate mixer cavity which also functions as a transmitting waveguide for feeding a common transmitting and receiving antenna. A separate mixer diode is coupled to the mixer cavity and thereby exposed to both the transmitted and the echo signal to produce a Doppler frequency output signal. A signal processing circuit is connected to the mixer diode and actuates an alarm in response to the Doppler signal.

11 Claims, 4 Drawing Figures

3,805,262

TRANSMISSION ANTENNA MIXER DOPPLER MOTION DETECTION

BACKGROUND OF THE INVENTION

This invention relates to a motion detector employing a radio frequency field within a volumetric space to be protected by responding to Doppler motion signals.

Highly satisfactory intrusion detection systems have been developed based on the Doppler motion generated signal phenomena wherein an oscillator is coupled through a suitable antenna to establish a radio frequency radiation pattern within a limited space to be protected. The movement of an intruding body such as an unauthorized person within the pattern results in an echo signal, the frequency of which is shifted from the original frequency by an amount dependent on the radial velocity of the target. The Doppler frequency signal is detected and utilized to trigger a suitable indicating device or alarm and thereby indicates and records the presence of the intruder. The basic operation of a low powered Doppler detector is based on the comparison of the transmitted and the echo signal. The difference between the transmitted and received signal is the related Doppler motion frequency. This frequency can be readily separated from the other transmitted frequencies by passing of the received signal through a low pass filter network. The Doppler motion frequency which is of a corresponding low frequency can then be fed into any suitable signal processing and level detection circuitry.

Separate transmitting and receiving antenna can be employed, or with appropriate design a single transmitting and receiving antenna can be employed with the signals combined in a circulator.

More recently, improved motion detection apparatus employing the Doppler frequency effect have been developed employing a common antenna based on the dual function of a solid state semiconductor in an oscillator. For example, the copending application of Carl F. Klein entitled "MOTION DETECTOR" which was filed Jan. 31, 1969 with Ser. No. 796,945 now U.S. Pat. No. 3,668,703 and which application is assigned to a common assignee herewith, discloses a transistor mounted within the base of an open ended waveguide or cavity and interconnected to form an oscillator circuit. The transistor functions as the active element to establish a transmitted radio frequency energy. The non-linear characteristic of the transistor performs the mixing of the transmitted and the echo signals and provides an output including the sum and different frequencies of the transmitted and received signals as well as the higher order of the harmonic terms of such signals. The copending application of Klein et al. entitled "INTRUSION DETECTION APPARATUS HAVING A HIGH FREQUENCY DIODE OSCILLATOR-MIXER ELEMENT," filed Aug. 16, 1971 with Ser. No. 172,052 now U.S. Pat. No. 3,750,165 also discloses a Doppler frequency detection unit employing a two-terminal oscillator-mixer element in the form of a high frequency solid state diode of the IMPATT avalanche transit time type or the bulk effect negative conductance phenomena, with such element mounted within an open ended coaxial cavity and operating above 5GHz. Such diodes provide intrusion detection apparatus having the required sensitivity to actuate an alarm in response to selected intrusion or movement of an intruder within the selected area of volumetric space. However, the dual functioning of the diodes required a compromise in the oscillator-receiver design.

SUMMARY OF THE PRESENT INVENTION

The present invention is particularly directed to an improved, simplified motion detector apparatus operating on the Doppler motion theory and in particular includes a separate common transmitter-mixer waveguide cavity connected between an antenna and a solid state cavity oscillator. The mixer cavity thus functions as a waveguide to transmit the RF signal to the antenna as well as receives a reflected signal from the antenna to mix with the transmitted frequency signal such that the single antenna serves the dual function of a radio frequency radiator and a microwave signal receiver.

Generally, in accordance with the present invention, the mixer cavity is formed as a waveguide with the oscillator mounted to one end of the waveguide and the antenna mounted to the opposite end. The waveguide is constructed to create a minimum VSWR and the diode means is coupled to the mixer cavity at a point to establish maximum sensitivity to the reflected signal to thereby produce a highly sensitive Doppler frequency output signal. The mixer diode may be directly mounted within the cavity or coupled to the cavity through a suitable probe assembly in accordance with well-known constructions. In either construction, the signal antenna mixer assembly is employed to transmit the field within the desired area and to detect movement of targets within the area of the radiated field.

Applicants have found that the transreceiving antenna mixer assembly provides a relatively simple and inexpensive means for providing a sensitive single antenna apparatus wherein the oscillating diode and the mixing diode can be selected to produce maximum operating efficiency and sensitivity.

BRIEF DESCRIPTION OF THE DRAWING

The drawing furnished herewith illustrates the best mode presently contemplated by the inventors for carrying out the present invention and clearly discloses the above advantages and features as well as others which will be readily understood from the following description of the illustrated embodiment.

In the drawing.

DESCRIPTION OF THE ILLUSTRATED EMBODIMENT

Figure 1:
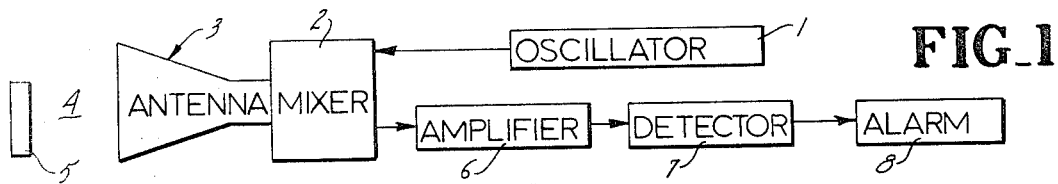
FIG. 1 is a block diagram of a low powered C-W Doppler motion detection system constructed in accordance with the present invention.
Figure 2:
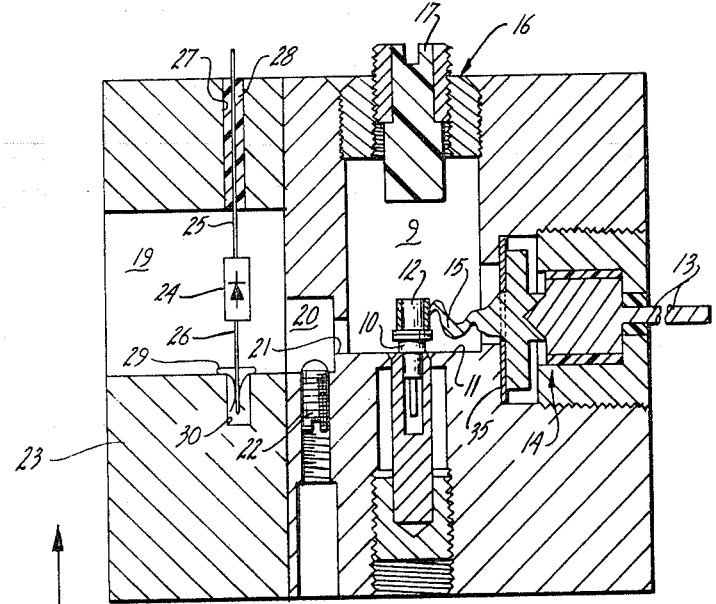
FIG. 2 is a vertical section through the detection apparatus including an oscillator unit connected to a single antenna by a transreceiving mixer unit constructed in accordance with the present invention and shown in block diagram in FIG. 1.

Referring to the drawings and particularly to FIGS. 1 and 2, the illustrated motion detection system includes a solid state diode oscillator 1 driven from a suitable constant current regulated power supply and coupled via a transreceiving mixer unit 2, constructed in accordance with this invention, to a single energy radiating and receiving antenna 3. The oscillator 1 generates a suitable radio frequency (RF) field which is fed by the mixer unit 2 to antenna 3 which establishes a corresponding energy field within an area or volumetric space 4 to be protected. The antenna 3 also receives motion related signals resulting from movement of an intruder 5 within the area or space 4. The transmitted and received signals are mixed within unit 2, as presently described, and coupled to a suitable amplifier-filter unit 6 which will pass the difference or Doppler frequency signal as an amplified motion detection signal. A level detector or detection circuit 7 such as a Schmitt trigger is connected to the output of the amplifier 6 and is connected to drive a suitable indicating or alarm system 8.

Referring particularly to FIG. 2, a preferred construction of the oscillator unit 1 and the mixer unit 2 are shown in accordance with the teaching of the present invention.

The oscillator unit 1 corresponds to the construction disclosed in Klein U.S. Pat. No. 3,624,555 and the previously identified application of Klein et al. and generally includes an oscillator cavity 9 with a solid state microwave diode 10 mounted adjacent and abutting a base wall 11 of a block-like housing. A coaxial transmission line 12 is secured to the diode 10 and projects coaxially outwardly thereof. A transmission or supply line 13 is connected via a suitable capacitive network 14 to a bias wire 15, which may be formed with a loop, as shown, to also function as an RF choke. The outermost end of the physical cavity may be closed by a tuning assembly 16 including a dielectric tuning rod 17. The microwave output energy is transmitted from the cavity 9 to a mixer-detection cavity 19, through a coupling impedance transformer 20 with a coupling iris 21 formed immediately adjacent to the base wall 11. An impedance coupling screw 22 is threadedly mounted for protrusion into the transformer cavity 20 to match the impedance.

The radio or microwave energy is generated as the result of the matching of the reactance and negative real resistance of the solid state diode 10 with its conjugate impedance. The diode's conjugate impedance is obtained using the open coaxial transmission line cavity 9 which is less than a quarter wave length long. This results in the continuous transmission of the microwave energy via the iris 21 and the coupling transformer 20 as more fully disclosed in the Klein U.S. Pat. No. 3,624,555.

In accordance with the present invention, the cavity 19 is coupled to transformer 20 and functions as a mixer-detection waveguide means to transmit the energy to the antenna 3 for direction into space 4. The cavity 19 is a generally rectangular waveguide in a blocking housing 23 bolted or otherwise secured to the oscillator unit 1 and extending outwardly therefrom. The antenna 3 is connected to the outer end of the waveguide cavity 19. Antenna 3 may be of any suitable construction such as a conical horn antenna which produces a desired radiation pattern within which movement of a human being or other selected body 5 is to be detected. In accordance with the present invention, the reflected microwave energy from a moving body is similarly fed via antenna 3 in a reverse manner into the mixer-detection cavity 19 and combined with the transmitted energy, as follows.

More particularly, a mixer diode 24 is mounted within the cavity 19 in the embodiment of FIG. 2 and is thus coupled to the oscillator 1 and to the antenna 3 by appropriate waveguide impedance elements so as to be subjected to both the transmitted field and the reflected signal.

The length of the block or cavity 19 is selected to correspond to the necessary length of the cavity as an efficient waveguide for transmission of the energy from the oscillator 1. The diode 24 which is diagrammatically shown, has a pair of connecting leads 25 and 26 which project vertically from the opposite ends of diode 23. The upper lead 25 extends outwardly through an opening 27 which includes a suitable insulating liner or tube 28 which defines a "by-pass" capacitor between the lead and the housing 23. The opposite lead 26 projects downwardly through the cavity 19 and is mounted within a suitable component receptacle 29 releasably secured within an opening 30 in the lower end of the cavity 19. The diode 24 is thereby generally supported centrally in the cavity 19 and is subjected to both the transmitted and the reflected energy to provide an output related to the several frequencies.

The non-linear characteristic of the diode 24 directly mixes the two frequencies producing the desired Doppler or difference frequency. This signal is processed by amplifier 6 which includes a suitable low pass filter network to produce an isolated Doppler output signal.

The separation of the oscillator unit 1 and the mixer unit 2 is desirable to permit optimum design of the oscillator function and of the mixer function. An oscillator should have a very high Q factor to minimize the effect of the load impedance. This characteristic, however, restricts the effectiveness of the oscillator elements as a signal mixer means. In particular, the diode 24 of this invention is mounted within the cavity 19 to establish a minimum transmitting VSWR (voltage standing ratio wave) and a maximum strength of the received signal.

Figure 3:
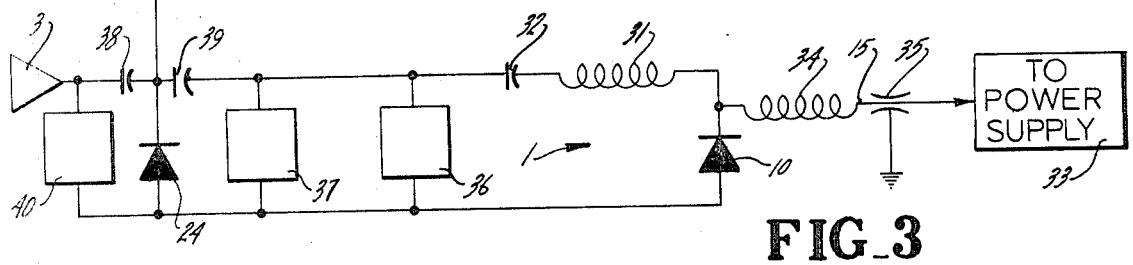
FIG. 3 is a schematic illustration of the apparatus shown in FIG. 2.

Thus, referring particularly to FIG. 3, a schematic illustration of the oscillator and mixer assembly of FIG. 2 is shown with the lumped circuit impedances identified by label boxes. Thus, the oscillator section of unit 1 includes the series inductance 31 and capacitance 32 of the diode 10 and the cavity 9 in series with the oscillator diode 10. The supply 33 is connected to the diode 10 in series with the inductance 34 created by the bias lead 15 and in shunt with by-pass capacitance 35. The oscillator coupling impedance 36 includes that of the cavity 9 and the transformer 20 appears across the diode 10 and associated impedances 31 and 32, and also in parallel with a coupling impedance 37 of the mixer cavity 19. The mixer diode 24 is also in parallel with the impedances 36 and 37 and capacitively coupled into the circuit by the pass-through capacitor formed by insulator 28 and shown by the capacitors 38 and 39 in FIG. 3. An antenna-mixer coupling impedance 40 appears across the input to diode 24 and the capacitor 38.

As previously noted, Applicants realized that a single waveguide could function as a transceiving antenna mixer assembly particularly because a portion of the transmitted signal is normally desirably fed into the separate receiving cavity. In accordance with the teaching of this invention, the several diode and cavity elements are selected and constructed to establish a minimum VSWR so as to provide optimum transmission and the mixer diode is then located to produce the maximum sensitivity to the reflected signal. Thus, the design of the apparatus must be related to producing this simultaneous dual functioning.

Generally, the oscillator diode impedances is matched to the conjugate load impedance which, of course, includes the several lumped impedances 36, 37 and 40 of FIG. 3. The mixer diode 22 is then located within the dual functioning cavity, such that the mixer diode is matched with the receiving impedance elements.

Practically, the transmitting signal parameter can be determined and the diode located experimentally by positioning within a slotted waveguide mixer cavity to the point of the necessary or maximum sensitivity.

The analysis of the design can otherwise generally best be related to the application and particularly the anticipated velocity of the intruder.

Thus, the operation of diode 24 can be analyzed as a self-excited mixer assembly or detector. This approach is generally most suitable where the velocity of the target 5 will be quite large and the incoming signal level will be relatively weak. The mixer diode 24 then is best described by the non-linear characteristic which combines the two signals and generates the sum and difference frequencies of the transmitted and reflector received signals as well as the usual higher order harmonic elements. The difference frequency is the most significant in a Doppler motion frequency unit, since it is directly related to and corresponds to the target motion frequency, and is coupled via lead 25 to the amplifier and filter unit 6.

Where the velocity of the target is relatively low and a relatively large incoming signal level is employed, the diode detector's performance can be theoretically analyzed more suitably as a load variation detector system. The target movement within the antenna's electromagnetic field will actually distort the field. This, of course, produces a related change in the antenna's impedance which, in turn, produces a corresponding or related change in the load impedance on both the oscillator 1 and the detector diode 24. Thus, the target's reflected signal disturbs the voltage standing wave ratio in both the antenna and the mixer cavity with a consequent change in the oscillator load and signal applied to the diode.

In a practical mixer cavity construction for operation with a transmitting frequency of $10.525 \times 10^9$ hertz and a Doppler frequency signal in the range of 0 to 700 hertz, solid block-like housing 23 had an outer dimension of 1.625 inches with mounting holes spaced inwardly 0.203 inches from the respective side edges and 1.74 inches from the top and bottom. The housing 23 had a length of 0.531 inches with a corresponding rectangular opening defined the mixer cavity 19. The height of the cavity 19 was 0.390 inches and the width was 0.890 inches. The diode 24 was an Hewlett-Packard diode No. 5082-2787 and was mounted within the housing 23 as shown with the lower lead supported by a component receptacle manufactured by Amp, Inc. with parts No. 380598-2.

Figure 4:
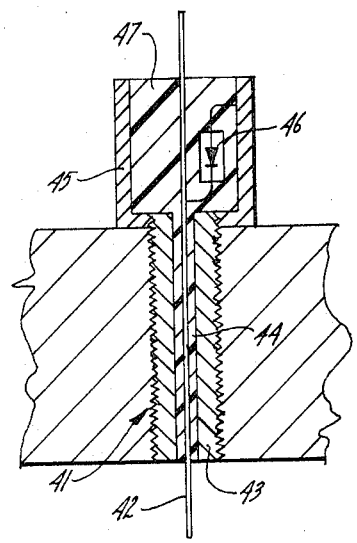
FIG. 4 shows an alternative construction with the mixer diode coupled to a cavity by a probe unit.

Although the diode is shown mounted directly within the mixer cavity, a diode probe system can also be employed. Thus, for example, as shown in FIG. 4, a generally rectangular block generally corresponding to that shown in FIG. 2 includes the mixer cavity. A diode mixer probe assembly 41 is secured within the upper wall with a small wire probe 42 projecting downwardly into the cavity 19. The probe 42 is a suitable wire extending outwardly through a probe holder which includes a suitable supporting tube 43 which is threaded into the upper wall of the housing and generally terminates in alignment with the upper wall of the cavity 19. An insulation liner 44 fills tube 43 and insulates the probe wire 42 from the housing. A supporting cup member 45 is secured to the tube member 43 and abuts the upper wall of the cavity housing. The wire 42 extends downwardly through the cup-shaped member 45. A diode 46 is disposed within the supporting cup member 45 and secured to the wire 42 and to the cup-shaped member 45, which is filled with a suitable supporting material such as an epoxy 47 to securely mount the diode 24 and the probe wire 42.

The probe wire 42 projects suitably into the cavity 19 and is subjected to both the transmitted and the reflected energy which is applied to the mixer diode 24 in accordance with the usual probe theory, to provide an output related to the several frequencies in the same manner as the application directly to the diode in the previous embodiment.

The theory of operation is essentially identical to that previously described and the diode probe is accurately located to derive maximum sensitivity to the reflected signals.

A physical construction with the diode coupled to the cavity as shown in FIG. 4 included a straight piece of 0.046 inch tinned wire which protruded outwardly from into the cavity approximately 0.250 inches. The outer housing portion contained an HP082-2787 diode which was interconnected to the probe wire and the housing. A suitable epoxy filled the cup-shaped member. The supporting tube 43 was a five thirty-seconds brass tube cut with an eight thirty-seconds thread and of a length of approximately 6.88 inches. The insulator was a rubber tube completely filling the length of the supporting brass tube 43.

Applicants have found that the common transreceiving antenna and waveguide mixer cavity provide a highly satisfactory low powered CW intrusion detection apparatus for protection of a limited area such as a large building or the like.

Various modes of carrying out the invention are contemplated as being within the scope of the following claims, particularly pointing out and distinctly claiming the subject matter which is regarded as the invention.

We claim:

1. A low powered Doppler motion detection apparatus for detection of intrusion into a limited space adjacent the apparatus, comprising a microwave oscillator means including a transmitting cavity means, a mixer-detector waveguide cavity means, a reduce height waveguide impedance transformer connecting said waveguide cavity means to the transmitting cavity means, a common transmitting and receiving antenna connected to the mixer-detection waveguide cavity means, and a mixer solid state means having a non-linear characteristic coupled to said mixer-detection waveguide cavity means.

2. The Doppler motion detection apparatus of claim 1 wherein said waveguide cavity means is constructed to establish coupling impedances between said mixer means and said antenna and between said mixer means and said oscillator means to create a minimum transmitter voltage standing wave ratio and a relatively large received signal at the mixer means.

3. The low powered Doppler motion detection apparatus of claim 1 wherein said mixer means is a diode means coupled to said mixer-detection waveguide cavity and said waveguide cavity means is constructed to establish coupling impedances to create a minimum transmitter voltage standing wave ratio and said diode means is located relative to said antenna to establish a relatively large received signal at the diode means.

4. The Doppler motion detection apparatus of claim 3 wherein said mixer diode means is mounted within the cavity.

5. The Doppler motion detection apparatus of claim 3 wherein said mixer diode means is coupled to said waveguide cavity means by a probe.

6. The Doppler motion detection apparatus of claim 1 having an amplification means connected to said mixer means to amplify the Doppler motion signal, a level detector connected to said amplification means to respond to signals of a predetermined minimum level, and alarm means connected to said level detector.

7. The Doppler motion detection apparatus of claim 1 wherein said oscillator means includes an oscillator diode means mounted within said transmitting cavity and connected to a power supply means for creating said microwave energy.

8. The low powered Doppler motion detection apparatus of claim 1 wherein said microwave oscillator means includes an oscillator diode means mounted within said transmitting cavity means and connected to a power supply means for creating said microwave energy, said mixer means is a diode means mounted coupled to said mixer-detection waveguide cavity means, said waveguide cavity means being constructed to create a minimum transmitter voltage standing ratio wave and said diode means being located to establish a maximum received signal at the diode means, amplification means connected to said mixer diode means to amplify the Doppler motion signal, a level detector connected to said amplification means to respond to signals of a predetermined minimum level, and alarm means connected to said level detector.

9. A low powered Doppler motion detection apparatus for detection of intrusion into a limited space adjacent the apparatus, comprising a coaxial cavity oscillator including an open end coaxial line within a transmitting cavity means, said cavity means having a transmitting iris in the sidewall thereof, a reduced height waveguide impedance transformer extending from said iris, a mixer-detection waveguide cavity means extending outwardly from said transformer and terminating in a common transmitting and receiving antenna means, and a mixing means having a non-linear characteristic coupled to the mixer-detection waveguide cavity means to produce an output signal in accordance with received Doppler motion signals.

10. The low powered Doppler motion detection apparatus of claim 9 including an aperture screw selectively positioned within said transformer immediately adjacent the iris to control the coupling between the transmitting cavity means and the waveguide cavity means.

11. The low powered Doppler motion detection apparatus of claim 9 including a detection probe unit having a central conductor mounted in insulated relationship within an outer wall and extending inwardly into the waveguide cavity means, a mixing diode mounted in insulated relationship within the probe unit and connected in series between the central probe and the outer wall of the probe unit.

* * * * *

UNITED STATES PATENT OFFICE
CERTIFICATE OF CORRECTION

Patent No. 3,805,262                    Dated April 16, 1974

Inventor(s) CARL F. KLEIN and ALFRED GIOVANELLI

It is certified that error appears in the above-identified patent and that said Letters Patent are hereby corrected as shown below:

Column 2, line 30, cancel "signal" and substitute therefor ---single---, column 3, line 55, cancel "blocking" and substitute therefor ---block---, column 4, line 49, cancel "includes" and substitute therefor ---including---, column 6, line 55, cancel "detector" and substitute therefor ---detection---, column 7, line 36, cancel "ratio wave" and substitute therefor ---wave ratio---, column 8, line 30, after "conductor" insert ---probe---

Signed and sealed this 8th day of October 1974.

(SEAL)
Attest:

McCOY M. GIBSON JR.
Attesting Officer

C. MARSHALL DANN
Commissioner of Patents